United States Patent

Yang

[11] Patent Number: 6,059,010
[45] Date of Patent: May 9, 2000

[54] ROLLER SUNSHADE FOR MOUNTING ON CAR ROOF

[75] Inventor: Ming-Shun Yang, Taipei, Taiwan

[73] Assignee: Formosa Saint Jose Corporation, Taipei, Taiwan

[21] Appl. No.: 09/354,064

[22] Filed: Jul. 15, 1999

[51] Int. Cl.[7] .................................................. B60J 11/00
[52] U.S. Cl. ....................... 160/370.22; 160/24; 160/301; 248/683; 248/362; 296/98
[58] Field of Search ................................ 160/370.22, 24, 160/122, 300, 301, 23.1; 296/98, 136, 97.7; 150/166, 168; 248/683, 205.5, 206.2, 206.3, 309.3, 363, 362; 362/397

[56] References Cited

U.S. PATENT DOCUMENTS

| | | | |
|---|---|---|---|
| 2,139,849 | 12/1938 | Powers | 248/205.5 |
| 2,594,386 | 4/1952 | Blessen | 296/97.7 |
| 3,102,584 | 9/1963 | Znamirowski | 160/300 |
| 3,904,164 | 9/1975 | Wheeler et al. | 248/362 |
| 4,125,142 | 11/1978 | Fohl | 160/300 X |
| 4,291,866 | 9/1981 | Petersen | 248/363 X |
| 4,828,303 | 5/1989 | Soria | 248/206.3 X |
| 4,852,926 | 8/1989 | Littell | 248/363 X |
| 5,036,898 | 8/1991 | Chen | 160/23.1 |
| 5,054,533 | 10/1991 | Lii | 160/23.1 X |
| 5,087,005 | 2/1992 | Holoff et al. | 248/363 X |
| 5,294,167 | 3/1994 | Yu | 296/98 |
| 5,423,466 | 6/1995 | Moon | 296/205.5 X |
| 5,462,329 | 10/1995 | Cheng | 296/98 |
| 5,464,052 | 11/1995 | Wieczorek et al. | 160/23.1 |
| 5,495,884 | 3/1996 | Shikler | 160/370.22 X |
| 5,564,770 | 10/1996 | Smith et al. | 160/370.22 X |
| 5,772,170 | 6/1998 | Tsukushi | 248/363 |
| 5,934,354 | 8/1999 | Price et al. | 160/370.22 |

*Primary Examiner*—Daniel P. Stodola
*Assistant Examiner*—Hugh B. Thompson
*Attorney, Agent, or Firm*—Erik M. Arnhem

[57] ABSTRACT

A roller sunshade for mounting on a car roof mainly includes more than one adhering sucker mechanism and an automatic sunshade winding mechanism. The adhering sucker mechanism can adhere to any point on the car roof by vacuum suction and each includes form bottom to top a sucker main body, a fixed seat, a height-adjusting fixing bar, a sleeve, a level-adjusting supporting board, a locating block, a bolt, and a connecting board. The automatic sunshade winding mechanism is connected to a top of the more than one adhering sucker mechanism and includes a sunshade cloth wound on a roller provided with a torsional spring, and a braking mechanism connected to one end of the roller. The braking mechanism includes a rotational sleeve connected to the torsional spring and a one-way ratchet. When the sunshade cloth is quickly pulled out, the rotational sleeve is allowed to rotate rapidly, and when the sunshade cloth is slowly pulled or rewound, the ratchet is stuck by a pawl to prevent the rotational sleeve from moving and the sunshade cloth is locked at the extended position.

8 Claims, 7 Drawing Sheets

ROLLER SUNSHADE FOR MOUNTING ON CAR ROOF

BACKGROUND OF THE INVENTION

The present invention relates to a roller sunshade for mounting on a car roof, and more particularly to a roller sunshade that can be easily mounted on any place on a car roof as needed to provide a shady place during outdoor activities.

Camping, fishing, and travelling have become the most favorite and popular recreational activities among most people in holidays in order to release them from busy work and tense life. In such outdoor activities, it is not always easy for people to find a shady place to escape from the strong sunrays. And, it is very uncomfortable and even harmful to expose to the strong sunrays for a prolonged time. A car equipped with means to provide a shady place would conveniently overcome the difficulty in finding a shady place in outdoors.

There are various types of sunshades for using outdoors. However, such conventional sunshades usually require different tools and a lot of fastening means, such as screws, to lock their four fixing means to two sides of the car roof, (that is, the dripping moldings). Thereafter, the bulky and heavy sunshade is screwed to the fixing means. The above procedure for connecting the conventional sunshade to a car roof in an attempt to provide a shady place is obviously time and labor consuming. And, once the sunshade is fixed to the car roof, it can not be easily dismounted from the car roof. To save troubles, the sunshade is frequently left on the car roof even the car is not used for outdoor recreational activities. The sunshade that is always carried on the car roof would make the car look strange and is subject to shortened usable life due to frequent exposure to the sunshine and rainwater.

Another problem with the conventional sunshade for mounting on a car roof is the sunshade usually has fixed height relative to the roof, and such fixed height would usually conflict with any lamp, antenna seat or luggage rack fixedly mounted on the roof and cause troubles in mounting the sunshade on the roof.

It is therefore tried by the inventor to develop an improved roller sunshade for mounting on a car roof to eliminate the drawbacks existing in the conventional sunshades.

SUMMARY OF THE INVENTION

A primary object of the present invention is to provide a roller sunshade that can be easily and conveniently mounted onto or dismounted from a car roof without the need of any tool.

Another object of the present invention is to provide a roller sunshade that is height-adjustably mounted on a car roof.

A further object of the present invention is to provide a roller sunshade for mounting on a car roof, in which a sunshade cloth thereof can be pulled out and easily locked to any desired extended position.

To achieve the above and other objects, the present invention mainly includes more than one adhering sucker mechanism and an automatic sunshade winding mechanism. The adhering sucker mechanism can adhere to any point on the car roof by vacuum suction and each includes form bottom to top a sucker main body, a fixed seat, a height-adjusting fixing bar, a sleeve, a level-adjusting supporting board, a locating block, a bolt, and a connecting board. The automatic sunshade winding mechanism is connected to a top of the more than one adhering sucker mechanism and includes a sunshade cloth wound on a roller provided with a torsional spring, and a braking mechanism connected to one end of the roller. The braking mechanism includes a rotational sleeve connected to the torsional spring and a one-way ratchet. When the sunshade cloth is quickly pulled out, the rotational sleeve is allowed to rotate rapidly, and when the sunshade cloth is slowly pulled or rewound, the ratchet is stuck by a pawl to prevent the rotational sleeve from moving and the sunshade cloth is locked at the extended position.

DETAILED DESCRIPTION OF THE PREFERRED EMBODIMENTS

Figure 1:
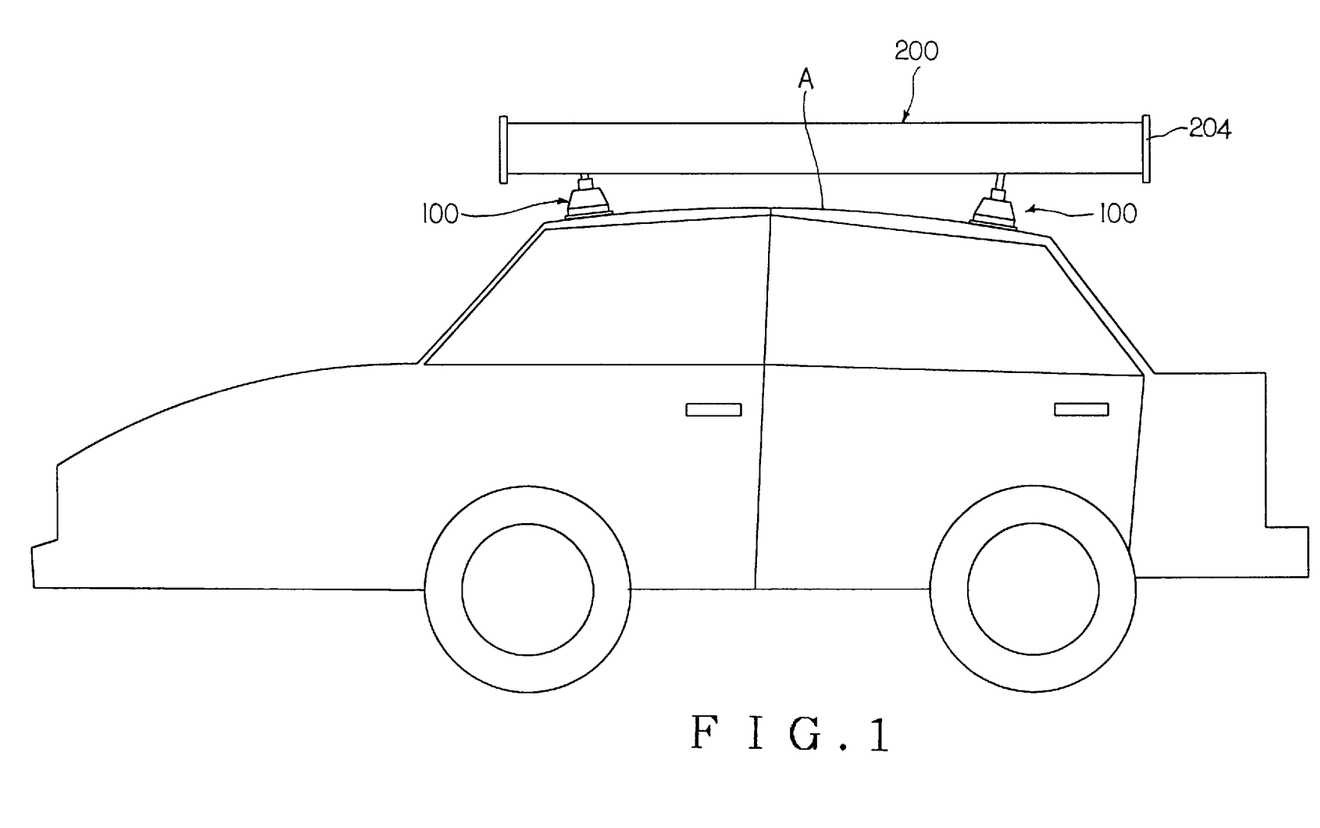
FIG. 1 schematically illustrates an example of mounting a roller sunshade of the present invention on a roof of a car.
Figure 2:
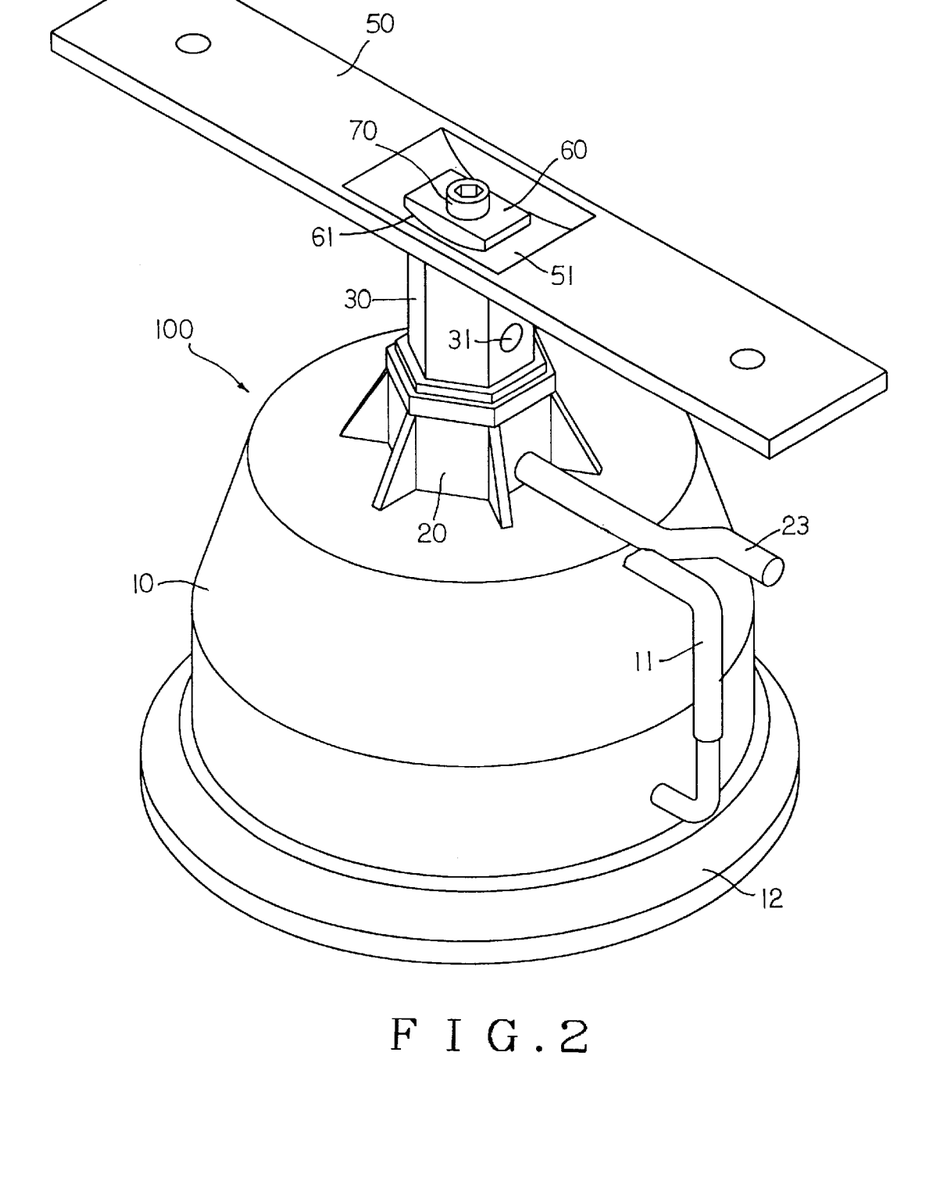
FIG. 2 is a perspective of an adhering sucker mechanism included in the present invention for fixing the roller sunshade to the car roof.

Please refer to FIGS. 1 and 2. The present invention relates to a roller sunshade for mounting on a car roof (A). The roller sunshade mainly includes more than one set of adhering sucker mechanism 100 and an automatic sunshade winding mechanism 200. In the following description, only one set of the adhering sucker mechanism 100 is illustrated and described. The adhering sucker mechanism 100 can be firmly attached by vacuum suction to any desired position on the car roof (A) and the automatic sunshade winding mechanism 200 is connected to a top of the adhering sucker mechanism 100. After the automatic sunshade winding mechanism 200 is fixed above the car roof (A) by means of the adhering sucker mechanism 100, a shade cloth 201 may be pulled out from the automatic sunshade winding mechanism 200 (see FIG. 5) to provide a shady place for use outdoors.

Figure 3:
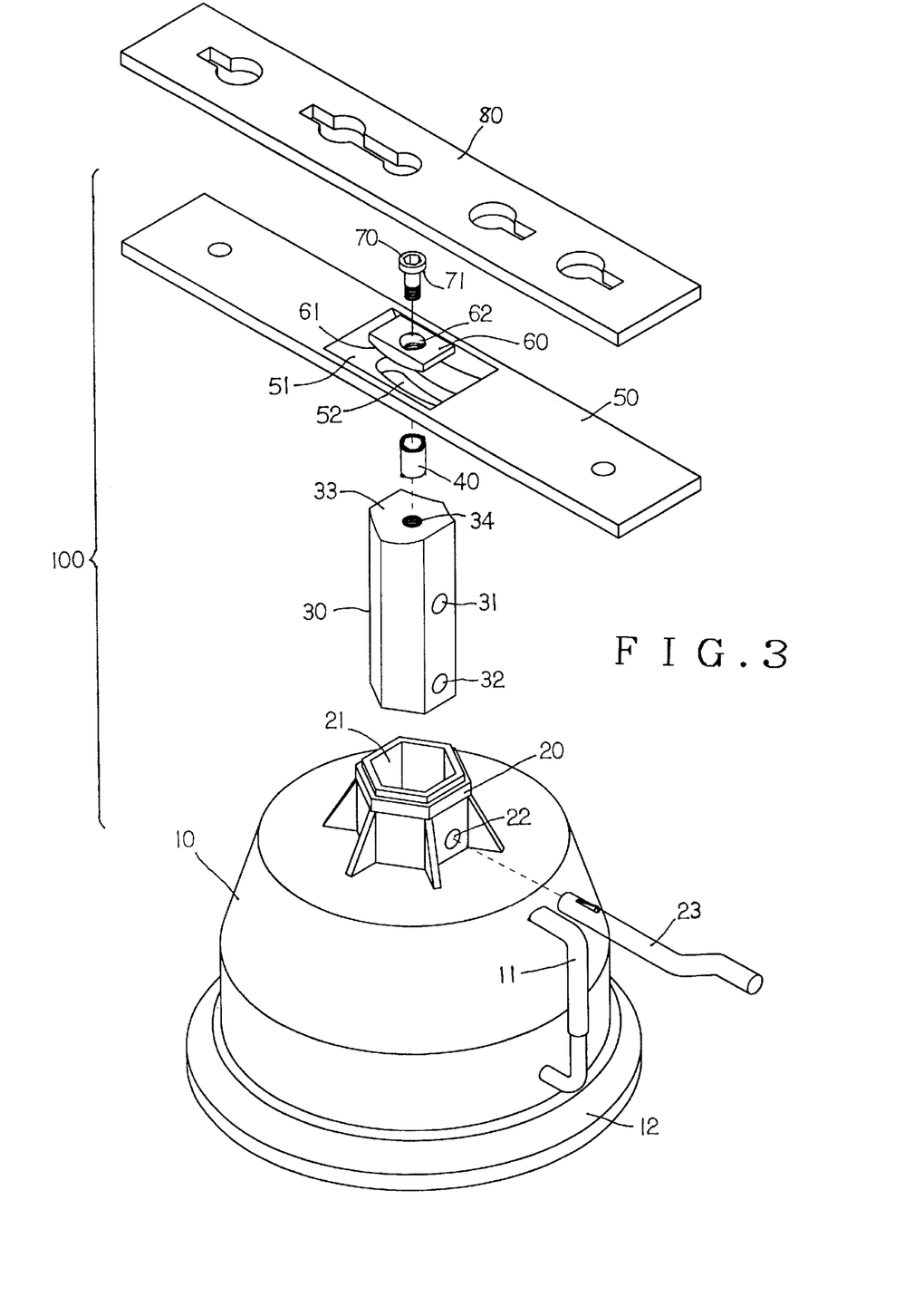
FIG. 3 is an exploded perspective of the adhering sucker mechanism of FIG. 2.
Figure 4:
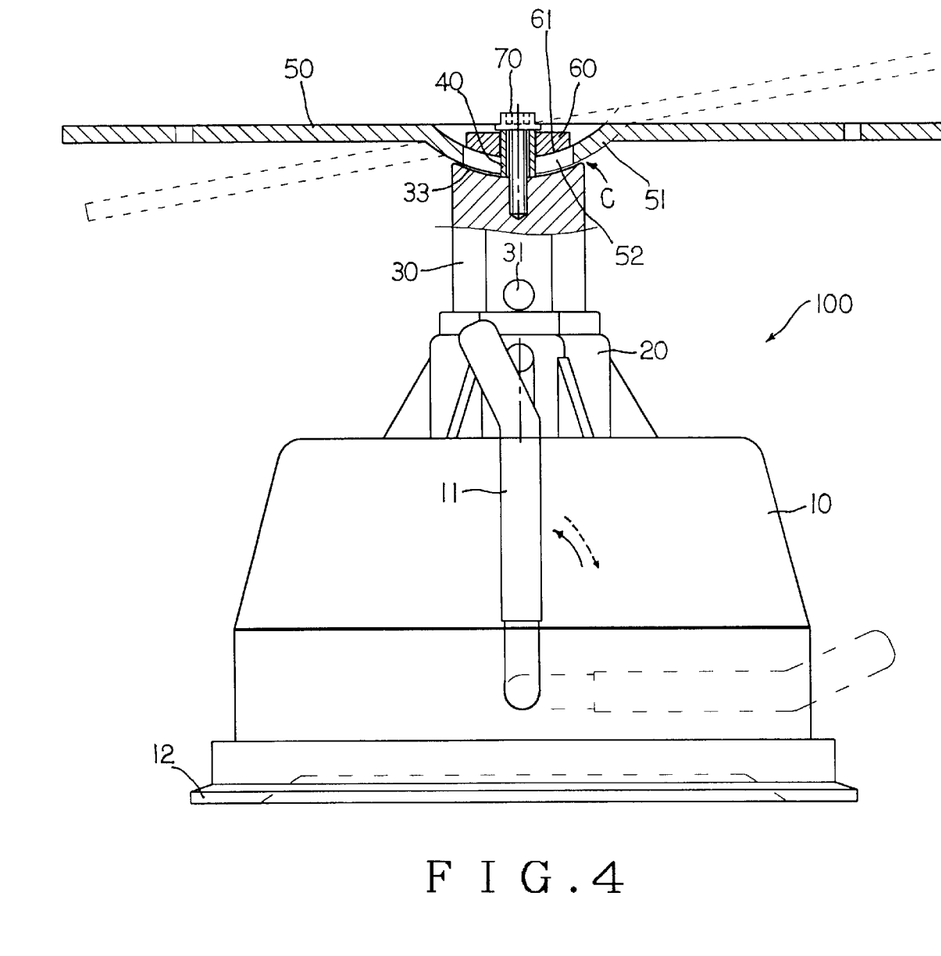
FIG. 4 is a partially sectional side view of the adhering sucker mechanism of FIG. 2 showing the operation thereof.

FIGS. 2, 3 and 4 give more details about the adhering sucker mechanism 100. As shown, the adhering sucker mechanism 100 each includes from bottom to top a sucker main body 10, a seat 20, a height-adjusting fixing bar 30, a sleeve 40, a level-adjusting supporting board 50, a locating block 60, a bolt 70, and a connecting board 80.

The sucker main body 10 has a handling bar 11 provided at an outer side thereof. When the adhering sucker mechanism 100 is positioned on the car roof (A) and the handling bar 11 is pivotally turned downward to a position indicated by the broken line in FIG. 4, a rubber concave disc portion 12 provided at a bottom of the main body 10 is upward pulled to vacuumize a space above the car roof (A) closed by the disc portion 12, causing the main body 10 to firmly and tightly adhere to the car roof (A) by vacuum suction without the risk of unexpectedly loosening from the roof (A). To remove the sucker main body 10 from the roof (A), simply pivotally turn the handling bar 11 upward to a position indicated by the solid line in FIG. 4. At this point, the vacuum state of the space between the rubber disc portion 12 and the roof (A) is released and the main body 10 can be easily removed from the roof (A). This structure allows the sucker main body 10 of the adhering sucker mechanism 100 to be freely mounted onto or removed from any position on the car roof (A) at any time without using any tool and is therefore very convenient for use.

The seat 20 of the adhering sucker mechanism 100 is fixedly centered on a top of the sucker main body 10 and has a top central insertion opening 21. The insertion opening 21 is preferable a polygonal opening. In the illustrated drawings, the insertion opening 21 is a pentagonal opening. A small hole 22 is provided on a wall of the seat 20 for a locating pin 23 to sideward insert into the seat 20 via the small hole 22.

The height-adjusting fixing bar 30 has a configuration matching with that of the insertion opening 21, so that it can be stably and firmly inserted into the insertion opening 21. At least an upper and a lower locating holes 31 and 32, respectively, are provided on a wall of the fixing bar 30 to horizontally extend into the fixing bar 30. When the fixing bar 30 is inserted into the insertion opening 21 of the seat 20, the locating pin 23 may be extended through the small hole 22 and into either the upper or the lower locating hole 31 or 32, so that the fixing bar 30 is firmly retained to the seat 20 and projects from the seat 20 by different height determined by the upper or the lower hole 31 or 32. When the fixing bar 30 is inserted in the seat 20 with the locating pin 23 extended into the lower locating hole 32, the automatic sunshade winding mechanism 200 may be mounted at a high position relative to the car roof (A) without being obstructed by lamp, antenna seat or luggage rack on the roof (A). A top of the fixing bar 30 forms a concave surface 33. And, an internally threaded hole 34 is centered at the concave surface 33.

The level-adjusting supporting board 50 includes a downward curved central area 51 protruded from a bottom surface of the supporting board 50. The curved central area 51 has a contour matching with that of the concave top surface 33 of the fixing bar 30. Therefore, the curved central area 51 is allowed to slidably move in the concave top surface 33 and accordingly allows adjustment of the supporting board 50 in its horizontal position relative to the roof (A). And, the curved central area 51 is provided with a lengthwise long hole 52.

The locating block 60 has a curved bottom 61 that has a contour matching with that of the curved central area 51 of the supporting board 50. Therefore, the locating block 60 could be positioned in the curved central area 51 with its bottom 61 fitly contacting with the central area 51. And, the locating block 60 has a vertical central hole 62 that is so sized that the sleeve 40 could be disposed therein.

The bolt 70 has a top flange 71 and could be tightly screwed into the internally threaded hole 34 on the top of the fixing bar 30.

As can be clearly seen from FIG. 4, the sleeve 40 has an overall length larger than a total thickness of the locating block 60 and the supporting board 50. Whereby when the locating block 60 is disposed in the curved central area 51 of the supporting board 50 with the sleeve 40 extended through the central hole 62 and the long slot 52, a lower end of the sleeve 40 would abut against the concave top surface 33 of the fixing bar 30 and an upper end of the sleeve 40 would slightly project from a top of the locating block 60. And whereby when the bolt 70 is extended through the central hole 62 of the locating block 60 and the long slot 52 of the supporting board 50 to screw into the internally threaded hole 34 on the top of the fixing bar 30, the top flange 71 of the bolt 70 would finally abut against the upper end of the sleeve 40 projected from the locating block 60. This design allows a clearance (C) to always exist between the curved central area 51 of the supporting board 50 and the concave top surface 33 of the fixing bar 30. With the existence of the clearance (C), the curved central area 51 is allowed to freely slidably move in the concave surface 33. Whereby, when the disc portion 12 of the adhering sucker mechanism 100 is adhered by vacuum suction to an inclined instead of a plane surface on the roof (A), the supporting board 50 can be easily adjusted to a suitable angle of inclination relative to the roof (A) to maintain it in a horizontal position.

As shown in FIG. 3, the connecting board 80 is connected to the supporting board 50 by fastening means (not shown), such as screws, after other components 10, 20, 30, 40, 50, 60, and 70 of the adhering sucker mechanism 100 have been fully assembled.

Please now refer to FIGS. 1, 5, 6 and 7. The automatic sunshade winding mechanism 200 includes a housing having a roller fixed therein, a long sunshade cloth 201 wound on a roller, and a torsional spring 203 mounted inside the roller to produce a torsional force to allow outward pulling and inward rewinding of the sunshade cloth 201 from and around the roller. The automatic sunshade winding mechanism 200 is mounted on a top of the adhering sucker mechanism 100 by, for example, sliding a rail 202 provided at a bottom of the housing onto the connecting board 80 and then using fastening means, such as screws (not shown), to lock the sunshade winding mechanism 200 to the adhering sucker mechanism 100.

Figure 5:
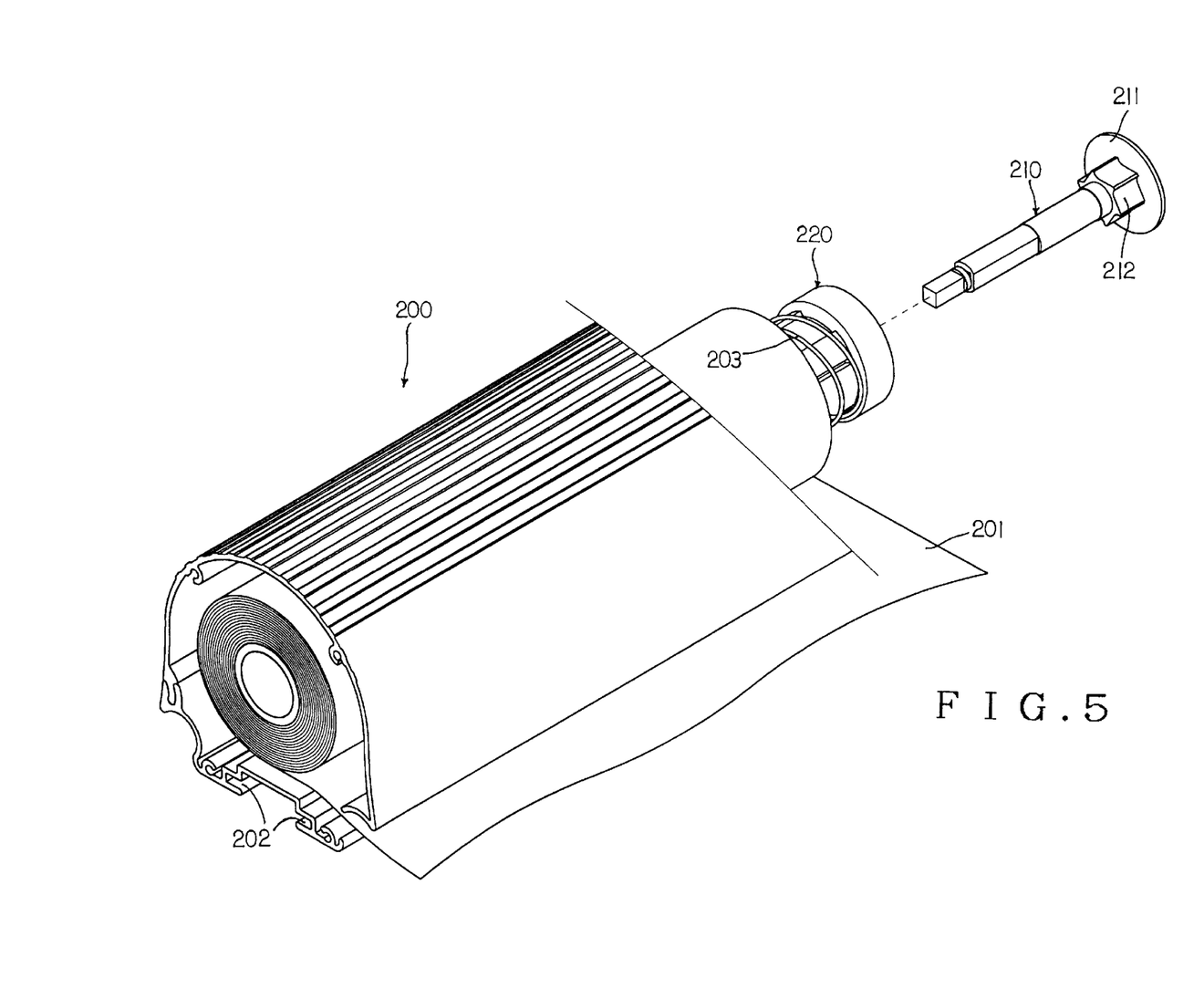
FIG. 5 is an exploded perspective of an automatic sunshade winding mechanism of the present invention, a part thereof is cut away to show an internal structure thereof.

The winding of the sunshade cloth 201 around the roller having the torsional spring 203 is a known skill and is not repeated herein. However, to allow the sunshade cloth 201 to be outward pulled or inward rewound and locked to any desired extended position at any time for use at different occasions, the automatic sunshade winding mechanism 200 of the present invention is particularly provided with a brake mechanism.

Figure 6:
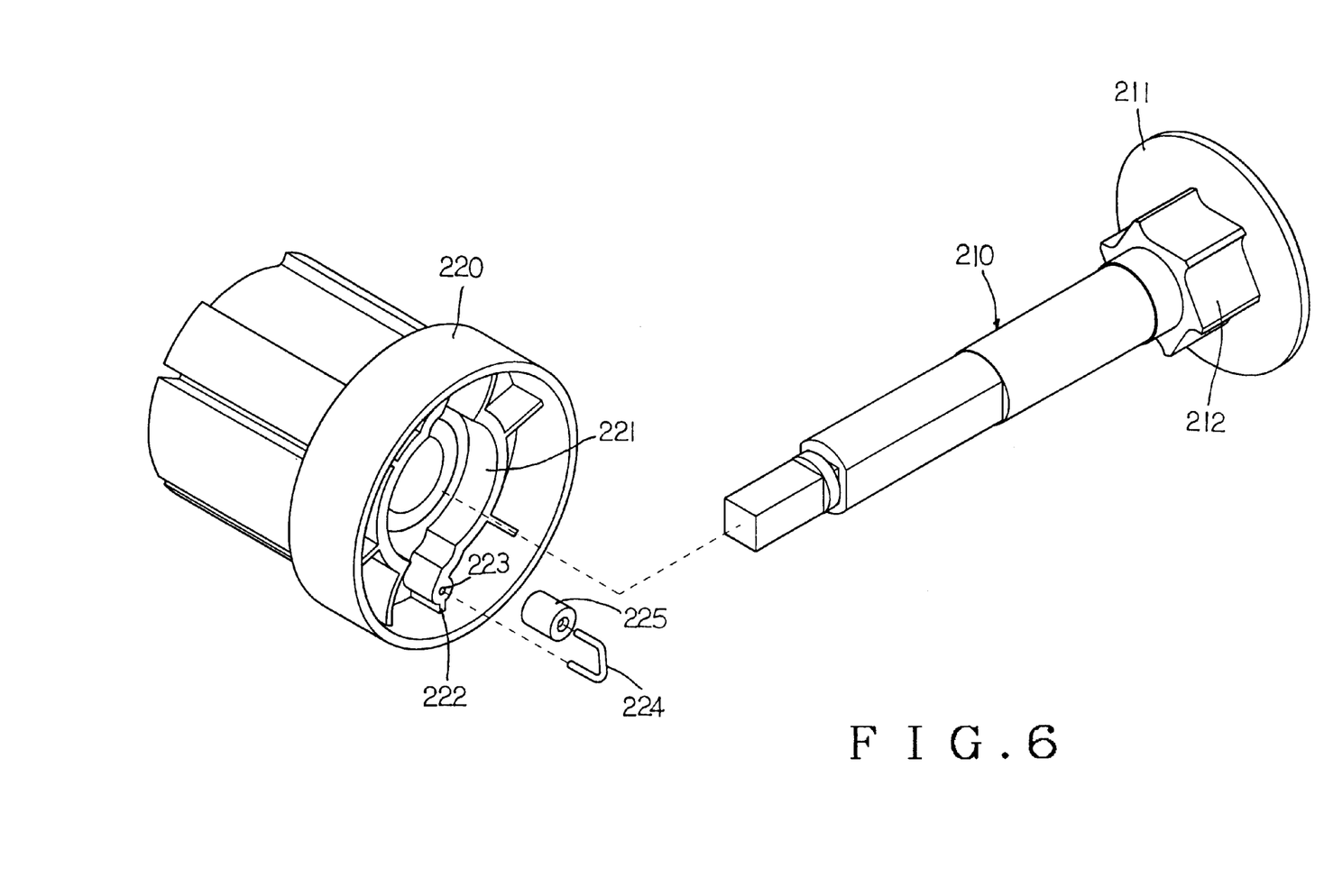
FIG. 6 is an exploded perspective of rotational sleeve and set pin of the automatic sunshade winding mechanism for automatically locking a sunshade cloth to a desired extended position.
Figure 7:
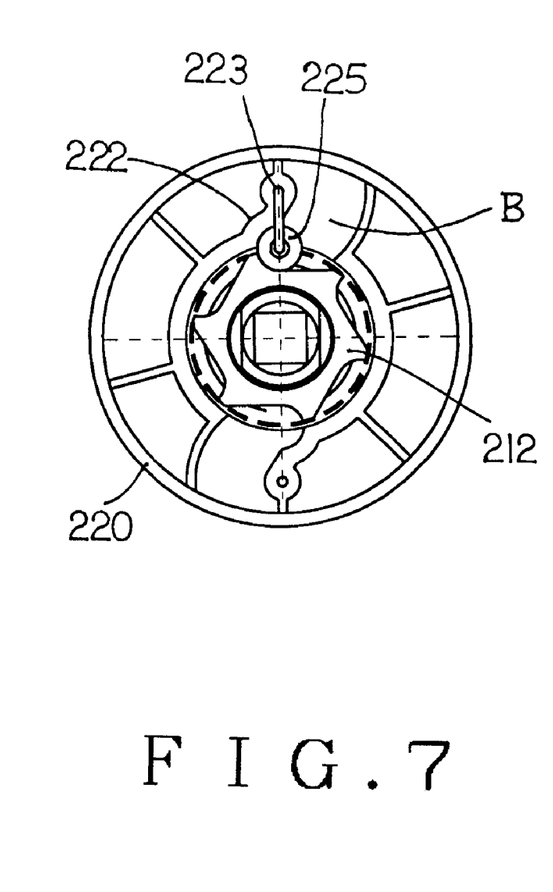
FIG. 7 is an end view of the rotational sleeve and the set pin in an assembled state with the set pin being locked in place by a weighted pawl to stop the rotational sleeve from moving.

The brake mechanism mainly includes a set pin 210 and a rotational sleeve 220. The set pin 210 has a diametrically expanded disc 211 provided at one end thereof. The disc 211 may close one end (it is the right end in the illustrated drawing) 204 of the housing of the automatic sunshade winding mechanism 200 for the set pin 210 to fixedly locate in the housing. And a one-way ratchet 212 is formed at an inner side of the disc 211 around the set pin 210. The rotational sleeve 220 is connected to the torsional spring 203. Thus, whenever the sunshade cloth 201 is pulled out or rewound back, the rotational sleeve 220 is brought by the torsional spring 203 to rotate very rapidly. The rotational sleeve 220 provides a central supporting space 221 in which the ratchet 212 is received. An extension arm 222 outward projects from a point on a peripheral wall of the supporting space 221 and a small hole 223 is provided near an outer end of the extension arm 222. A U-shaped retaining means 224 having two legs is pivotally connected to the extension arm 222 by inserting one leg thereof into the small hole 223. A weighted pawl 225 is mounted around the other leg of the U-shaped retaining means 224 and is allowed to freely swing within a curved space (B) generally contained between the extension arm 222 and the ratchet 212, as can be clearly seen from FIGS. 7 and 8.

Figure 8:
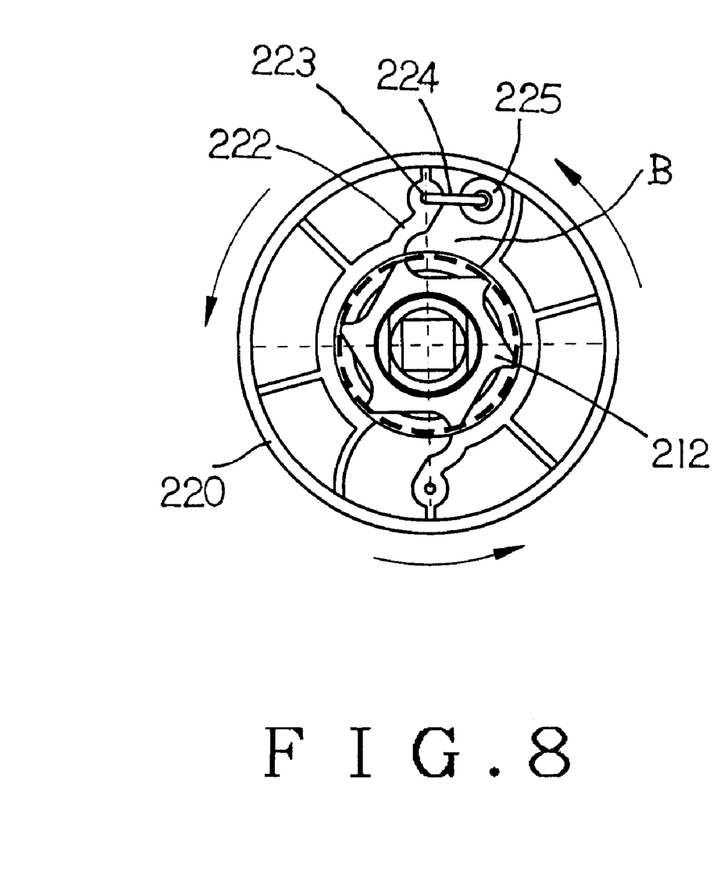
FIG. 8 is an end view similar to FIG. 7 with the weighted pawl being thrown beyond the set pin for the rotational sleeve to rotate freely.

As shown in FIG. 8, when the sunshade cloth 201 is quickly pulled or rewound, the rotational sleeve 220 is caused to rotate rapidly to generate a centrifugal force larger than a gravity of the weighted pawl 225 connected to the outer end of the extension arm 222 via the U-shaped retaining means 224. At this point, the weighted pawl 25 is thrown outward to a position beyond the ratchet 212, and therefore the rotational sleeve 220 is allowed to keep rotating unimpededly and the sunshade cloth 201 be freely pulled or rewound. On the contrary, when the sunshade cloth 201 is slowly pulled or rewound, the generated centrifugal force of the rotational sleeve 220 is smaller than the gravity of the weighted pawl 225. At this point, the weighted pawl 225 naturally depends from the extension arm 222 and locates at an inner portion of the curved space (B), that is, between two teeth of the one-way ratchet 212, to stop the rotational sleeve 220 from moving any further. Accordingly, the sunshade cloth 201 is locked in place at its extended position.

With the above arrangements, the roller sunshade for mounting on a car roof according to the present invention has simple structure and can be easily mounted on or dismounted from any place on the car roof. And, the sunshade cloth thereof can be freely pulled or rewound and locked to any desired extended position. The present invention is therefore an improved product over the conventional sunshades for cars and is practical for use.

What is claimed is:

1. A roller sunshade for mounting on a car roof, comprising more than one adhering sucker mechanism and an automatic sunshade winding mechanism;
   each said adhering sucker mechanism comprising:
   a sucker main body having a handling bar provided at an outer side thereof;
   a seat being fixedly centered at a top of said sucker main body and being provided at a top center with a polygonal insertion opening and on a peripheral wall with a small through hole for a locating pin to extend therethrough;
   a height-adjusting fixing bar having a configuration matching with that of said polygonal insertion opening on said seat for stably and firmly inserted in said polygonal opening, said fixing bar having a concave top surface with an internally threaded hole centered thereat;
   a sleeve being disposed on said concave top surface of said fixing bar;
   a level-adjusting supporting board being supporting on the top of said fixing bar and having a downward curved central area protruded from a bottom surface thereof, said downward curved central area having a configuration matching with that of said concave top surface of said fixing bar and therefore being able to freely slidably move in said concave top surface of said fixing bar, and a slot being formed in said curved central area for said sleeve to upward extend therethrough;
   a locating block being positioned in said downward curved central area of said supporting board and having a curved bottom matching with and therefore fitly contacting with said downward curved central area, and a through hole being formed on said locating block for said sleeve to upward extend therethrough and project therefrom;
   a bolt being downward screwed through said locating block, said curved central area of said supporting board, and said sleeve into said internally threaded hole on the top of said fixing bar, said bolt having a top flange against which an upper end of said sleeve projected from said locating block abuts; and
   a connecting board being screwed to a top of said supporting board; and
   said automatic sunshade winding mechanism comprising:
   a housing into which a roller having a long sunshade cloth wound thereon and a torsional spring mounted therein is mounted, said housing having a bottom rail with which said connecting board of a respective said adhering sucker mechanism is slidably engaged to allow said automatic sunshade winding mechanism to mount on a top of said respective adhering sucker mechanism; and
   a braking mechanism; said braking mechanism comprising:
   a rotational sleeve being connected to one end of the roller and the torsional spring in said housing, said rotational sleeve having an outer end providing a central supporting space, and an extension arm outward projected from a peripheral wall of said supporting space; and
   a set pin having a diametrically expanded disc provided at an outer end thereof, said disc having a one-way ratchet provided at an inner side thereof around said set pin, said set pin being inserted into said rotational sleeve with said one-way ratchet located in said central supporting space and said disc closing one lateral end of said housing.

2. A roller sunshade for mounting on a car roof as claimed in claim 1, wherein said height-adjusting fixing bar is provided on a wall thereof with at least adequately spaced upper and lower holes, and said locating pin extended through said hole on said seat may be further extended into either said upper or said lower holes on said fixing bar to lock said fixing bar in said seat with said concave top surface projected from said seat by different height.

3. A roller sunshade for mounting on a car roof as claimed in claim 1, wherein said slot formed on said curved central area of said supporting board is a long slot having a size just for said sleeve to extend therethrough.

4. A roller sunshade for mounting on a car roof as claimed in claim 1, wherein said hole on said locating block is centered at said locating block and is sized to just for said sleeve to extend therethrough.

5. A roller sunshade for mounting on a car roof as claimed in claim 1, wherein said sleeve has an overall height larger than a total thickness of said locating block and said supporting board, such that a clearance is allowed to exist between said concave top surface of said fixing bar and said downward curved central area of said supporting board for said curved central area to freely slidably move on said concave top surface of said fixing bar.

6. A roller sunshade for mounting on a car roof as claimed in claim 1, wherein said extension arm projected from the wall of said supporting space on said rotational sleeve has a small hole formed near an outer end thereof, and a U-shaped retaining means having two legs being connected to said extension arm by extending one leg thereof through said small hole, said U-shaped retaining means being connected at the other leg to a weighted pawl, such that said weighted pawl is allowed to free swing within a curved space between said extension arm and said one-way ratchet mounted in said supporting space.

7. A roller sunshade for mounting on a car roof as claimed in claim 6, wherein said rotational sleeve is caused to rotate rapidly when said sunshade cloth is quickly pulled or rewound and therefore generates a centrifugal force larger than a gravity of said weighted pawl, causing said weighted pawl to be thrown to a position beyond said ratchet.

8. A roller sunshade for mounting on a car roof as claimed in claim 6, wherein said sunshade cloth can be slowly pulled or rewound to cause said rotational sleeve to rotate slowly and generate a centrifugal force smaller than the gravity of said weighted pawl, causing said weighted pawl to naturally depend from said extension arm and locate between two teeth of said ratchet to stop said rotational sleeve from moving any further.

* * * * *